(12) United States Patent
Peters

(10) Patent No.: US 7,899,748 B2
(45) Date of Patent: Mar. 1, 2011

(54) SERVER WALLET PROVIDER PORTAL

(75) Inventor: Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2111 days.

(21) Appl. No.: 10/758,853

(22) Filed: Jan. 16, 2004

(65) Prior Publication Data

US 2005/0071269 A1  Mar. 31, 2005

Related U.S. Application Data

(63) Continuation-in-part of application No. 10/675,503, filed on Sep. 30, 2003.

(51) Int. Cl.
*G06Q 40/00* (2006.01)
(52) U.S. Cl. ............................................. 705/40; 705/39
(58) Field of Classification Search .................. None
See application file for complete search history.

(56) References Cited

U.S. PATENT DOCUMENTS

| | | | | |
|---|---|---|---|---|
| 6,873,974 | B1 * | 3/2005 | Schutzer | 705/41 |
| 7,062,258 | B1 * | 6/2006 | Sini et al. | 455/414.1 |
| 2002/0032616 | A1 * | 3/2002 | Suzuki et al. | 705/26 |
| 2002/0052842 | A1 * | 5/2002 | Schuba et al. | 705/40 |
| 2002/0065774 | A1 * | 5/2002 | Young et al. | 705/41 |
| 2002/0107755 | A1 * | 8/2002 | Steed et al. | 705/26 |
| 2003/0120593 | A1 * | 6/2003 | Bansal | |

FOREIGN PATENT DOCUMENTS

| | | |
|---|---|---|
| EP | 1 168 264 A2 | 1/2002 |
| EP | 1 182 625 A1 | 2/2002 |
| EP | 1 379 044 A1 | 1/2004 |
| KR | 1020030024893 | 3/2003 |

OTHER PUBLICATIONS

VISA. (Dec. 2003). Method and system for delivering multiple services.*
MeT. (Feb. 21, 2001). MeT Authorization for account based payment using a SET Wallet Server, retrieved Oct. 25, 2010, from ProQuest Databse.*
"MeT Authorization for Account Based Payment Using a SET Wallet Server", Mobile Electronic ransactions Org., Feb. 21, 2001, XP002221755.

* cited by examiner

*Primary Examiner* — Thomas Dixon
*Assistant Examiner* — Benjamin S Fields
(74) *Attorney, Agent, or Firm* — Scott D. Paul, Esq.; Carey Rodriguez Greenberg Paul, LLP

(57) ABSTRACT

The present invention is a mobile server wallet provider portal, system, method and apparatus. A MSWP portal can include a configuration for communicative coupling both to a plurality of MSWPs and also to a content proxy. A composite profile generator further can be included which can be configured to combine a plurality of MSWP profiles into a single, composite profile for routing payment messages in the proxy to the MSWP portal. Finally, the MSWP portal can include selection logic configured to process a user selection of one of the MSWPs to process a payment transaction received through the proxy. In a preferred aspect of the invention, the content proxy can be a wireless service proxy (WSP). In this regard, the WSP further can include a filter plug-in configured to route the payment messages to the portal when the payment messages match rules specified within the composite profile.

16 Claims, 5 Drawing Sheets

SERVER WALLET PROVIDER PORTAL

CROSS REFERENCE TO RELATED APPLICATIONS

This patent application is a continuation-in-part of U.S. patent application. Ser. No 10/675,503 entitled DYNAMIC PROCESSING OF PAYMENT REQUESTS FOR MOBILE COMMERCE TRANSACTIONS filed on Sep. 30, 2003, the contents of which are incorporated herein by reference.

BACKGROUND OF THE INVENTION

1. Statement of the Technical Field

The present invention relates to the field of mobile commerce and more particularly to processing payment requests with mobile server wallets in a payment transaction management network.

2. Description of the Related Art

Mobile commerce transactions are those e-commerce transactions which can be initiated through a mobile pervasive device such as a cellular telephone, personal digital assistant or a digital pager. Typical mobile commerce transactions include the purchase of goods or services, travel tickets including airfare and admission to venues such as sporting events, motion pictures or musical concerts. In a conventional e-commerce transaction, payment for the transaction can be cleared through a third-party payment system communicatively coupled to a Web server hosting the transaction. In this regard, the conventional e-commerce transaction can include a simple scheme of content browsing client, content server and payment clearance system.

Mobile commerce transactions differ from e-commerce transactions principally by way of the mobility of the pervasive device. Specifically, in addition to a content server and payment clearance system, a wireless service provider will be required to act as a gateway between a network of pervasive devices and the Internet. Importantly, given the mobility of pervasive devices in mobile commerce, mobile server wallets have been deployed to facilitate the exchange of payment information from the pervasive device of the shopper and the merchant payment clearance system. Mobile Server Wallets can store shipping information, billing information, payment methods, payment information and the like for the convenience both of the shopper and the merchant. Individual Mobile Server Wallets can be accessed by the merchant at checkout to facilitate the transaction without requiring the manual intervention of the shopper.

To provide to the shopper the convenience of a Mobile Server Wallet, a relationship must be established between the Wireless Service Provider and the Mobile Server Wallet Provider. Yet, by its very nature individual ones of pervasive devices may enjoy relationships with Mobile Server Wallet Providers which remain unknown to the Wireless Service Provider. In this regard, the Mobile Server Wallet Provider can be disposed within the Wireless Service Provider, within a separate Internet Service Provider, within the content servers of financial institutions, within the transaction processing facilities of individual merchants, or within a content portal. Nevertheless, regardless of the identity of the Mobile Server Wallet Provider, the Wireless Service Provider must know this identity to properly route payment messages.

FIG. 1 is a schematic illustration of a well-known mobile transaction architecture in which payment messages can be routed through a Mobile Server Wallet Provider disposed within a wireless network. The architecture of the known art can include a wireless services gateway 140 coupled to a mobile service wallet provider (MSWP) 120 within a wireless service provider network. In operation, a user mobile device 110 can communicate with an on-line store 150 through both wireless and wire-bound portions of the global Internet. When consummating a transaction, the MSWP 120 can intercept the "checkout page" and can process the checkout page in association with the mobile server wallet (not shown) provided by the user mobile device 110. Specifically, the MSWP 120 can route the payment transaction to a suitable payment issuer 160 disposed among a multitude of payment issuers 130. The payment issuer 160 can process the transaction to produce a commitment of payment. Subsequently, the payment issuer 160 can route the commitment to the on-line store 150 through the MSWP 120.

As it will be apparent to the skilled artisan, the conventional manner in which MSWP technology has been integrated into the mobile commerce paradigm remains deficient in several important respects. First, substantial infrastructure will be required to support the MSWP 120 within the wireless network. Minimally, the MSWP 120 must include a full-fledged operating system, a database management system and an application server. Yet, the foregoing architecture hardly represents a minimally invasive configuration. Additionally, the architecture of FIG. 1 cannot scale to support the dynamic selection of different mobile server wallets through multiple MSWPs.

SUMMARY OF THE INVENTION

The present invention addresses the deficiencies of the art in respect to MSWP management and provides a novel and non-obvious method, system and apparatus for managing multiple MSWPs through a single MSWP portal in a mobile commerce system. In a preferred aspect of the invention, a MSWP portal can include . . . a configuration for communicative coupling both to a plurality of MSWPs and also to a content proxy. A composite profile generator further can be included which can be configured to combine a plurality of MSWP profiles into a single, composite profile for routing payment messages in the proxy to the MSWP portal. Finally, the MSWP portal can include selection logic configured to process a user selection of one of the MSWPs to process a payment transaction received through the proxy. In a preferred aspect of the invention, the content proxy can be a wireless service proxy (WSP). In this regard, the WSP further can include a filter plug-in configured to route the payment messages to the portal when the payment messages match rules specified within the composite profile.

A payment transaction system incorporating the MSWP portal of the present invention can include one or more MSWPs coupled to respective on-line financial institutions. At least one content proxy can be configured for coupling both to on-line merchants and end user customers of the on-line merchants. Finally, at least one MSWP portal can be disposed between the MSWPs and the content proxy. Notably, the content proxy can include a WSP. Moreover, the content proxy further can include a filter plug-in configured to route payment messages to the MSWP portal when the payment messages match rules specified within a profile provided to the filter plug-in by the MSWP portal.

In a method for processing a payment transaction in a mobile commerce system, a payment message can be processed in a portal to identify one of a selection of MSWPs to handle an associated payment transaction. Subsequently, the payment message can be routed to the payment message to an identified one of the MSWPs. Preferably, individual MSWP profiles can be combined for each of the MSWPs into a composite profile. Once combined, the composite profile can be provided to a content proxy for use in trapping payment messages passing through the content proxy between an online merchant and a customer in the mobile commerce system.

The processing step of the inventive method can include the steps of identifying a customer associated with the payment message and parsing a profile associated with the customer to determine a selection a preferred MSWPs. A user interface can be rendered so as to present the selection of preferred MSWPs to the customer. Consequently, a particular one of the preferred MSWPs can be selected to handle the associated payment transaction based upon data provided by the customer in the user interface. Subsequently, payment transaction data produced by the selected one of the preferred MSWPs can be relayed to the customer. Similarly, payment transaction data produced by the selected one of the preferred MSWPs can be relayed to a merchant associated with the payment transaction.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a MSWP portal. The MSWP portal can be coupled to a plug-in to a content routing proxy for routing payment messages to selected mobile server wallets supported by corresponding MSWPs. The routing proxy can be disposed in a wireless service provider network established to support a multitude of pervasive devices through wireless communications links. The plug-in can intercept payment messages sent between a merchant computing system and a pervasive device of a subscriber to the wireless service provider network. An association between the subscriber and the MSWP portal can be established. Subsequently, the plug-in can route the payment message to a corresponding MSWP portal which in turn can provide the subscriber with a selectable set of MSWPs from which the subscriber can select a particular one of the MSWPs to process the payment message.

Figure 1:
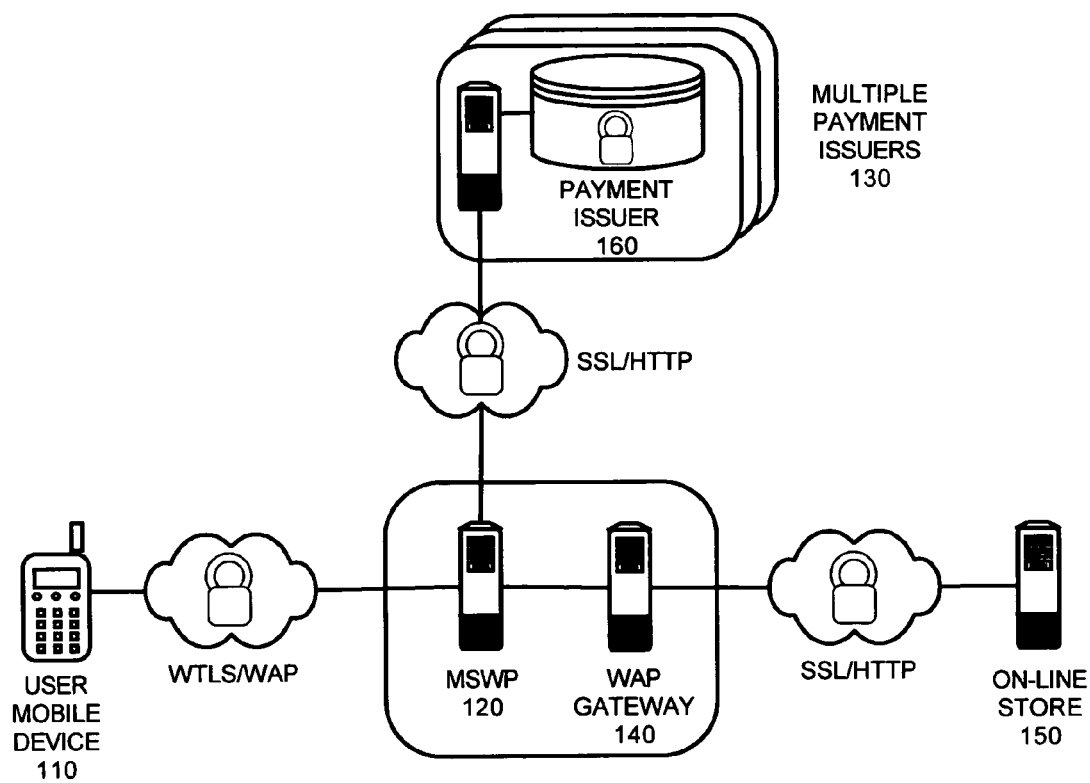
FIG. 1 is schematic illustration of a payment transaction management system known in the state of the art.
Figure 2:
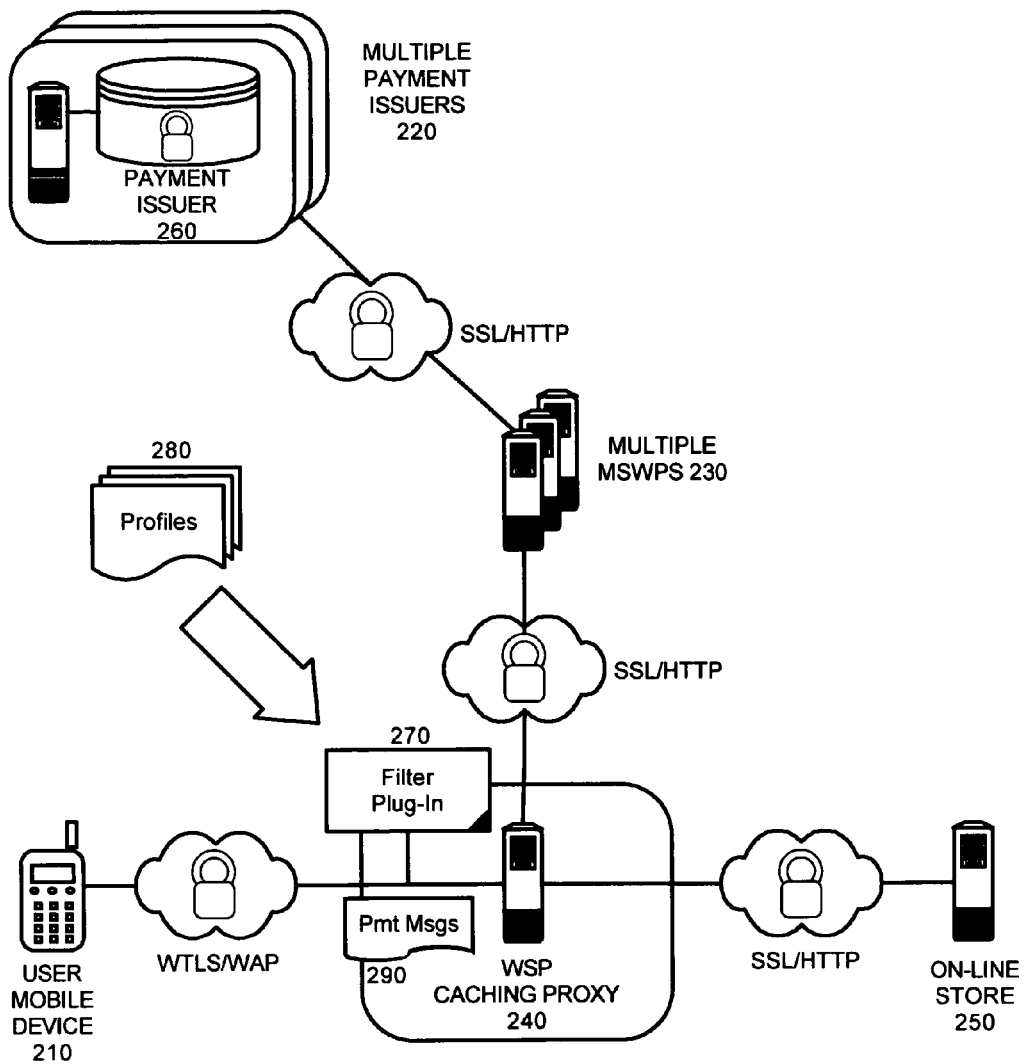
FIG. 2 is a schematic illustration of a payment transaction management system incorporating a plug-in to a content routing proxy for routing payment messages to selected mobile server wallets supported by corresponding MSWPs.

FIG. 2 is a schematic illustration of a payment transaction management system disposed in a wireless service provider network in which the MSWP portal of the present invention can be disposed. The payment transaction management system can include a multiplicity of MSWPs 230 communicatively coupled to one or more payment issuers 220. Each one of the MSWPs 230 can obtain a guarantee of payment from a payment issuer 260 among the multiple payment issuers 220 for a purchaser associated with a mobile server wallet managed by the MSWP 230. The process of obtaining a guarantee of payment can be linked to the interception of a payment message 290 between a merchant 250 and a pervasive device 210 in the wireless server provider network.

More specifically, a filter plug-in 270 can be programmatically coupled to a routing proxy server 240 disposed within the wireless server provider network. For example, the routing proxy server 240 can be a caching proxy server such as the WebSphere™ Everyplace Server™ manufactured by IBM Corporation of Armonk, N.Y., United States. In any case, the filter plug-in 270 can read data flowing through the proxy server 240 to identify data of interest. In accordance with the inventive arrangements, data of interest can be a payment message associated with a particular subscriber, a particular pervasive device, a particular merchant, or any other identifying characteristic. Notably, by "keying" the filter plug-in 270 to specific subscribers, the routing operation of the plug-in 270 can be limited to those subscribers who use mobile server wallets.

Once a payment message 290 has been identified as meeting the criteria of a filter configured within the filter plug-in 270, the payment message 290 can be routed to a specific mobile server wallet managed by a corresponding one of the MSWPs 230. The corresponding one of the MSWPs 230, in turn, can obtain a guarantee of payment from a specific payment issuer 260 from among the multiple payment issuers 220. Once a guarantee of payment can be obtained, the MSWPs. 230 can return the payment information within a payment message 290 intended for the merchant system 250. In this regard, the payment message 290 can be a completed "checkout" page.

Figure 3:
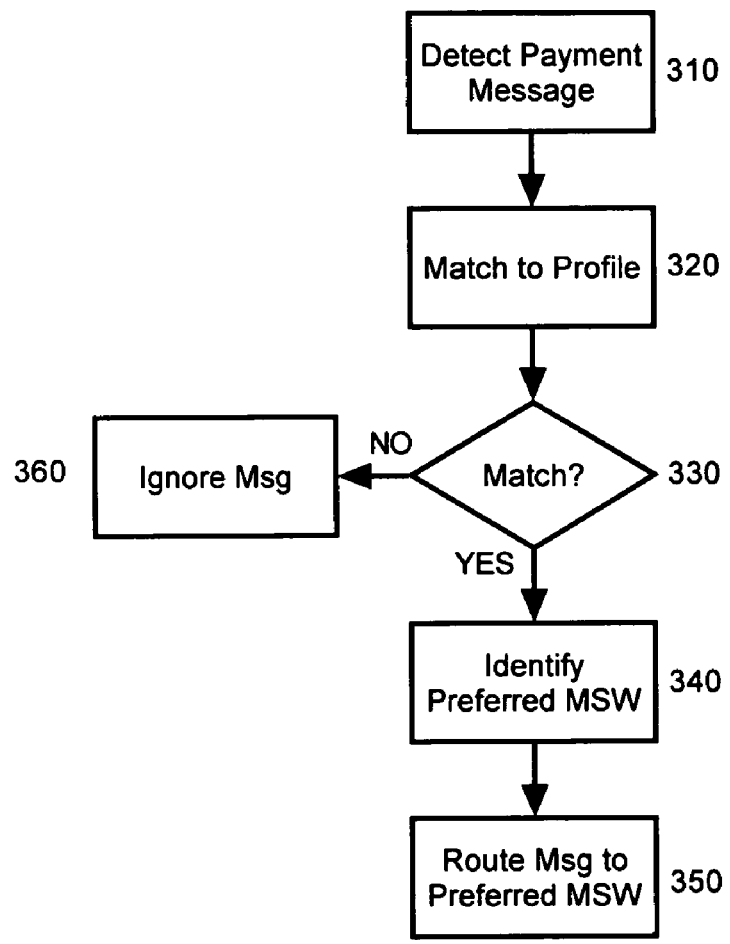
FIG. 3 is a flow chart illustrating a process for filtering the management of a payment request in the payment transaction management system of FIG. 2.

Importantly, it will be recognized by the skilled artisan that unlike conventional payment transaction processing known in the prior art in which all payment messages are processed statically within a fixed MSWP within the wireless service provider network, in the system of the present invention the filter plug-in 270 can avoid the consumption of excessive overhead by filtering only those payment messages 290 which can be acted upon based on an association with a particular subscriber, particular merchant, particular content, or other such filtering characteristic. To that end, FIG. 3 is a flow chart illustrating a process for filtering the management of a payment request in the payment transaction management system of FIG. 2.

Beginning in block 310, a payment message can be detected as the message flows through a proxy server in the wireless service provider network. In block 320, an aspect of the message, for instance a recipient address or sending address, can be compared to a filter to determine whether the payment message ought to be processed in the filter, or ignored. In decision block 330, if the filter indicates a match between the aspect of the payment message and the filter, in block 340 a preferred mobile server wallet can be identified and in block 350 the payment message can be routed to the preferred mobile server wallet. Otherwise, in block 360 the payment message can be ignored by the filter.

Returning now to FIG. 2, a set of profiles 280 can be provided within the wireless service provider network. Each of the profiles 280 can reference a different merchant with whom a corresponding one of the MSWPs 230 is to be associated. Alternatively, each of the profiles 280 can indicate a commerce standard such as e-commerce markup language which can be processed by the filter plug-in 270. For each one of the profiles 280 which specifies an associated one of the MSWPs 230, the filter plug-in 270 can monitor message traffic originating from the associated one of the MSWPs 230. In this regard, each of the profiles 280 can include a fully qualified uniform resource locator of a merchant Web site in addition to those form tags which can be processed in the merchant Web site. As message traffic flows through the proxy server 240, the filter plug-in 270 can monitor the payment messages 290 for data which matches the filter condition specified in a relevant one of the profiles 280. When the condition has been matched, the specified mobile server wallet can intervene to facilitate the payment transaction.

Notably, by requiring only a plug-in 270 to the proxy server 240, the wireless service provider network can be partnered with other entities who can provide the mobile server wallet functionality to their respective subscribers. In consequence, the wireless service provider network need neither manage nor host the mobile server wallets themselves. Thus, the configuration of the wireless service provider network with the filter plug-in can give rise to several advantageous hosting scenarios. For example, the wireless service provider can host the mobile server wallet giving the provider the ultimate control over mobile commerce transactions through its network. Yet, with control comes responsibility and such a configuration will require the wireless service provider to manage the mobile server wallet.

In accordance with the present invention, the mobile server wallet can be hosted in a portal using a "walled garden" approach. Shoppers can be provided with a large number of mobile merchants and a mobile server wallet with which purchases can be transacted in the mobile merchants. In further illustration, FIG. 4 is a schematic illustration of the payment transaction management system of FIG. 2 which has been configured with an MSWP portal in accordance with a preferred aspect of the present invention.

Figure 4:
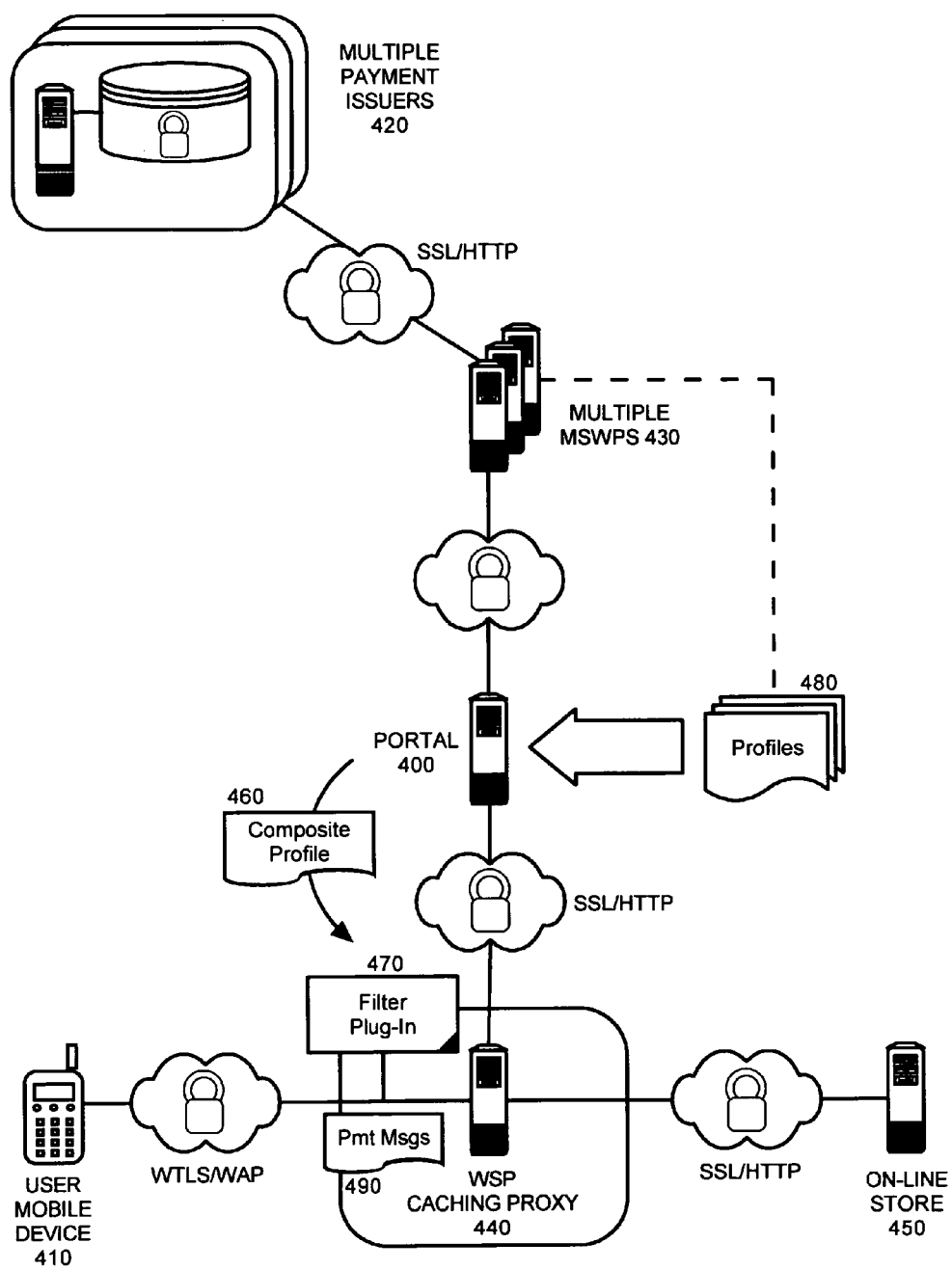
FIG. 4 is a schematic illustration of the payment transaction management system of FIG. 2 which has been configured with an MSWP portal in accordance with a preferred aspect of the present invention; and, FIG. 5 is a flow chart illustrating a process for filtering the management of a payment request in the payment transaction management system of FIG. 4.

The payment transaction system illustrated in FIG. 4 can include an MSWP portal 400 coupled to a filter plug-in 470 to a WSP caching proxy 440 as in the case of the system of FIG. 2. The filter plug-in 470 can be programmed to inspect payment messages 490 passing between an on-line merchant 450 and an end user 410 over a computer communications network. The filter plug-in 470 further can be programmed to identify specific messages for specific end users associated with the MSWP portal 400. Unlike the configuration of FIG. 2, however, the filter plug-in 470 need not identify a specific one of the MSWPs 430 to process a particular payment message 490 based upon an appropriate one of the profiles 480. Rather, the selection of one of the MSWPs 430 can be deferred to the MSWP portal 400.

In this regard, the MSWP portal 400 can be coupled to one or more MSWPs 430 which in turn can be coupled to one or more payment issuers 420 over a secured computer communications network. The corresponding one of the MSWPs 430, when required, can obtain payment guarantees from specific ones of the payment issuers 420. The selection of the specific MSWPs 430 to process the payment messages 490, however, can be handled within the MSWP portal 400. In particular, the MSWP portal 400 can query the profiles 480 for each coupled one of the MSWPs 430. The queried profiles 480 can be aggregated into a composite profile 460 provided to the filter plug-in 470 in the WSP 440 caching proxy 440.

When a trapped one of the payment messages 490 matches one of the rules in the composite profile 460, the filter plug-in 470 can pass the trapped one of the payment messages 490 to the MSWP portal 400. The MSWP portal 400 in turn can query the end user 410 as to which of the MSWPs 430 ought to handle the transaction associated with the trapped one of the payment messages 490. Additionally, the MSWP portal 400 can determine from the trapped one of the payment messages 490 whether the trapped one of the payment messages 490 represents a new transaction, or merely a component of an ongoing transaction.

Figure 5:
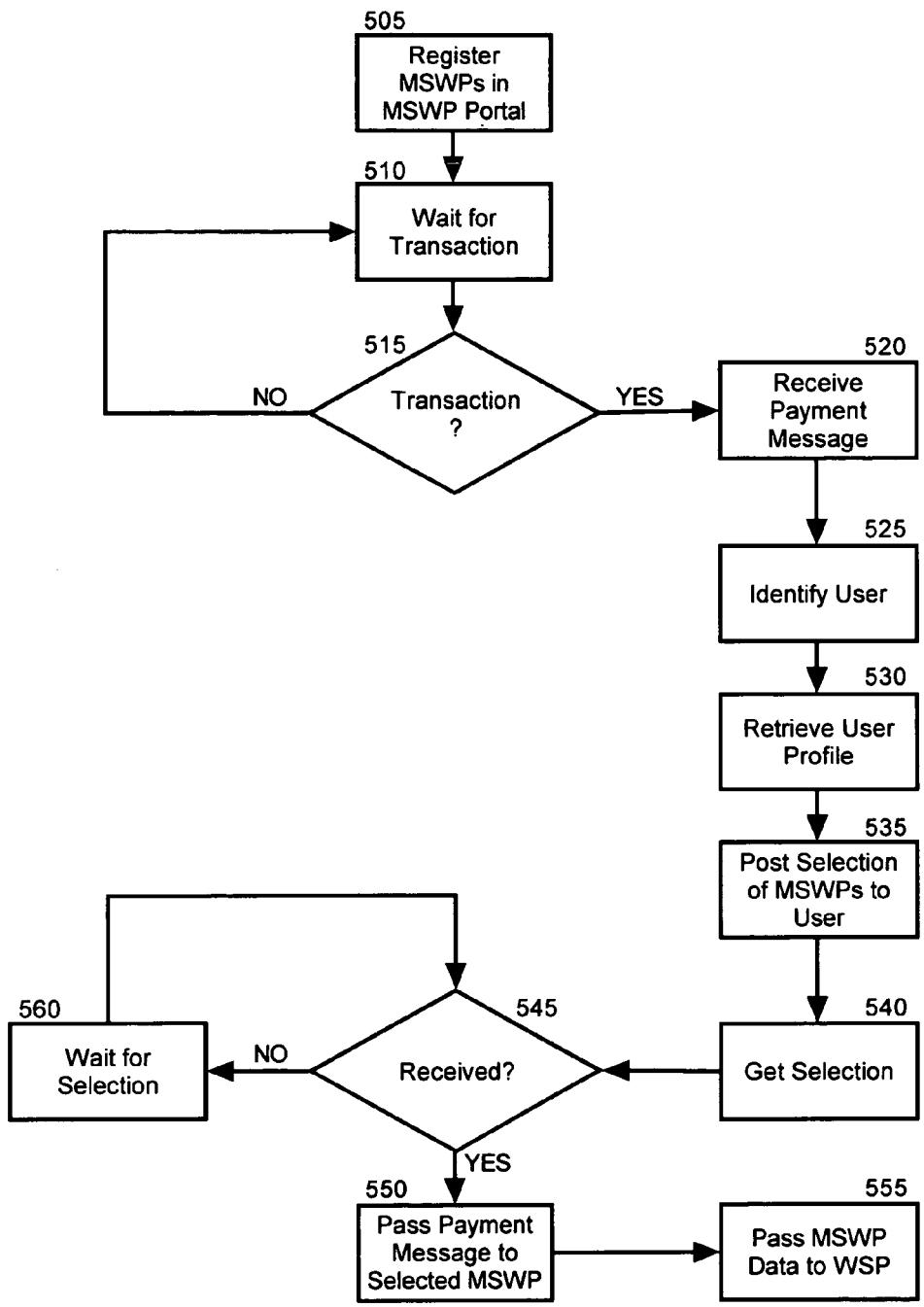

In more particular illustration, FIG. 5 is a flow chart illustrating a process for filtering the management of a payment request in the payment transaction management system of FIG. 4. Beginning in block 505, one or more MSWPs can be registered on behalf of a user or class of users in the MSWP portal. Each registered MSWP can include a stored profile specifying one or more preferred payment mechanisms and payment data for the user or class of users. The stored profile of each MSWP can be combined in a single composite profile for use in processing payment transaction messages received in the WSP. Subsequently, in blocks 510 and 515 the MSWP can await a transaction.

Once a transaction is requested in the MSWP portal, in block 520 the payment message can be received and the user or class of user associated with the payment message can be identified in block 525. Based upon the identity of the user or class of user, the profile for the user can be retrieved which can indicate which MSWPs are preferred by the identified user or class of users. In block 535, the user can be presented with a choice of MSWPs as specified in the profile. Subsequently, in blocks 540, 545 and 560, the process can await the selection of a specific MSWP to process the payment message.

In decision block 545, if a selection of a particular MSWP is received, in block 550 the payment message can be passed to the selected MSWP. The selected MSWP in turn can process the payment message, for instance by requesting that the user select a preferred payment method from among a selection of known preferred payment methods. The selected MSWP further can present to the user pre-established payment data for verification by the user, including billing address and shipping address data. Finally, in block 555 the selected MSWP can forward the pertinent payment transaction data to the WSP via the MSWP portal. In this regard, the pertinent payment transaction data can include data required to complete a purchase transaction form provided by a merchant, or the pertinent payment transaction data can include an actual payment guarantee or a unique account number useful for guaranteeing payment for the transaction.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A mobile server wallet provider (MSWP) portal comprising:
    a configuration for communicative coupling both to a plurality of MSWPs and also a content proxy;
    a composite profile generator configured to combine a plurality of MSWP profiles into a single, composite profile for routing payment messages in said proxy to the MSWP portal; and,
    selection logic configured to process a user selection of one of said MSWPs to process a payment transaction received through said proxy.

2. The portal of claim 1, wherein said content proxy is a wireless service proxy (WSP).

3. The portal of claim 2, wherein said WSP further comprises a filter plug-in configured to route said payment messages to the portal when said payment messages match rules specified within said composite profile.

4. A payment transaction system comprising:
    a plurality of mobile server wallet providers (MSWPs) coupled to respective on-line financial institutions;
    at least one content proxy configured for coupling both to on-line merchants and to end user customers of said on-line merchants; and,
    at least one MSWP portal disposed between said MSWPs and said at least one content proxy.

5. The system of claim 4, wherein said content proxy comprises a wireless service proxy (WSP).

6. The system of claim 4, wherein said content proxy further comprises a filter plug-in configured to route payment messages to said MSWP portal when said payment messages match rules specified within a profile provided to said filter plug-in by said MSWP portal.

7. A method for processing a payment transaction in a mobile commerce system, the method comprising the steps of:
    processing a payment message in a portal to identify one of a selection of mobile server wallet providers (MSWPs) to handle an associated payment transaction;
    routing said payment message to said payment message to an identified one of said MSWPs;
    combining individual MSWP profiles for each of said MSWPs into a composite profile; and,
    providing said composite profile to a content proxy for use in trapping payment messages passing through said content proxy between an on-line merchant and a customer in the mobile commerce system.

8. The method of claim 7, wherein said processing step comprises the steps of:
    identifying a customer associated with said payment message;
    parsing a profile associated with said customer to determine a selection a preferred MSWPs;
    rendering a user interface presenting said selection of preferred MSWPs to said customer; and,
    selecting a particular one of said preferred MSWPs to handle said associated payment transaction based upon data provided by said customer in said user interface.

9. The method of claim 8, further comprising the step of relaying payment transaction data produced by said selected one of said preferred MSWPs to said customer.

10. The method of claim 8, further comprising the step of relaying payment transaction data produced by said selected one of said preferred MSWPs to a merchant associated with said payment transaction.

11. The method of claim 10, wherein said relaying step comprises the step of relaying a payment guarantee to said merchant by said selected one of said preferred MSWPs.

12. A machine readable storage having stored thereon a computer program for processing a payment transaction in a mobile commerce system, the computer program comprising a routine set of instructions which when executed by the machine cause the machine to perform the steps of:
    processing a payment message in a portal to identify one of a selection of mobile server wallet providers (MSWPs) to handle an associated payment transaction;
    routing said payment message to said payment message to an identified one of said MSWPs;
    combining individual MSWP profiles for each of said MSWPs into a composite profile; and,
    providing said composite profile to a content proxy for use in trapping payment messages passing through said content proxy between an on-line merchant and a customer in the mobile commerce system.

13. The machine readable storage of claim 12, wherein said processing step comprises the steps of:
    identifying a customer associated with said payment message;
    parsing a profile associated with said customer to determine a selection a preferred MSWPs;
    rendering a user interface presenting said selection of preferred MSWPs to said customer; and,
    selecting a particular one of said preferred MSWPs to handle said associated payment transaction based upon data provided by said customer in said user interface.

14. The machine readable storage of claim 13, further comprising the step of relaying payment transaction data produced by said selected one of said preferred MSWPs to said customer.

15. The machine readable storage of claim 13, further comprising the step of relaying payment transaction data produced by said selected one of said preferred MSWPs to a merchant associated with said payment transaction.

16. The machine readable storage of claim 15, wherein said relaying step comprises the step of relaying a payment guarantee to said merchant by said selected one of said preferred MSWPs.

* * * * *